US010855996B2

(12) United States Patent
Amini et al.

(10) Patent No.: US 10,855,996 B2
(45) Date of Patent: Dec. 1, 2020

(54) ENCODER SELECTION BASED ON CAMERA SYSTEM DEPLOYMENT CHARACTERISTICS

(71) Applicant: Arlo Technologies, Inc., Carlsbad, CA (US)

(72) Inventors: Peiman Amini, Mountain View, CA (US); Joseph Amalan Arul Emmanuel, Cupertino, CA (US)

(73) Assignee: ARLO TECHNOLOGIES, INC., Carlsbad, CA (US)

( * ) Notice: Subject to any disclaimer, the term of this patent is extended or adjusted under 35 U.S.C. 154(b) by 3 days.

(21) Appl. No.: 16/119,932

(22) Filed: Aug. 31, 2018

(65) Prior Publication Data

US 2019/0260987 A1     Aug. 22, 2019

Related U.S. Application Data

(60) Provisional application No. 62/633,017, filed on Feb. 20, 2018.

(51) Int. Cl.
*H04N 7/12* (2006.01)
*H04L 29/06* (2006.01)
(Continued)

(52) U.S. Cl.
CPC .......... *H04N 19/166* (2014.11); *G06F 9/542* (2013.01); *G06K 9/00771* (2013.01); *G06T 7/20* (2013.01); *G07C 9/37* (2020.01); *G08B 3/10* (2013.01); *G08B 3/1016* (2013.01); *G08B 5/223* (2013.01); *G08B 13/191* (2013.01); *G08B 13/193* (2013.01); *G08B 13/1966* (2013.01);
(Continued)

(58) Field of Classification Search
None
See application file for complete search history.

(56) References Cited

U.S. PATENT DOCUMENTS

2010/0109934 A1   5/2010 Drake et al.
2013/0053653 A1   2/2013 Cuddihy et al.
(Continued)

OTHER PUBLICATIONS

"Amazon Kinesis Video Streams Developer Guide", Amazon Web Services, Inc., 2018, 136 pp.
(Continued)

*Primary Examiner* — Christopher Braniff
(74) *Attorney, Agent, or Firm* — Perkins Coie LLP; Michael A. Glenn

(57) ABSTRACT

A technique is described for selecting an encoder to encode video captured by a network-connected camera system based on characteristics of deployment of the network connected cameras system. The network-connected camera system may include one or more cameras and a base station connected to each other via a network, which can be a wireless network. A processing system, for example at the base station, receives data indicative of characteristics of deployment of the network-connected camera system, processes the received data to select an encoder, and causes the one or more cameras to process captured video using the selected encoder. In some embodiments, encoder selections can be continually updated based on changes in the deployment of the network-connected camera system.

28 Claims, 10 Drawing Sheets

(51) Int. Cl.

| | | |
|---|---|---|
| *H04N 19/103* | (2014.01) | |
| *H04N 19/156* | (2014.01) | |
| *H04N 19/42* | (2014.01) | |
| *H04N 19/166* | (2014.01) | |
| *H04N 19/124* | (2014.01) | |
| *H04N 19/184* | (2014.01) | |
| *H04N 19/40* | (2014.01) | |
| *H04B 17/318* | (2015.01) | |
| *H04B 17/391* | (2015.01) | |
| *H04N 5/232* | (2006.01) | |
| *H05B 47/19* | (2020.01) | |
| *G07C 9/37* | (2020.01) | |
| *H05B 47/105* | (2020.01) | |
| *G06F 9/54* | (2006.01) | |
| *G06K 9/00* | (2006.01) | |
| *G06T 7/20* | (2017.01) | |
| *G08B 3/10* | (2006.01) | |
| *G08B 5/22* | (2006.01) | |
| *G08B 13/191* | (2006.01) | |
| *G08B 13/193* | (2006.01) | |
| *G08B 13/196* | (2006.01) | |
| *G08B 21/18* | (2006.01) | |
| *G08B 27/00* | (2006.01) | |
| *G08B 29/18* | (2006.01) | |
| *H04L 1/00* | (2006.01) | |
| *H04L 5/00* | (2006.01) | |
| *H04L 12/26* | (2006.01) | |
| *H04L 29/08* | (2006.01) | |
| *H04N 5/247* | (2006.01) | |
| *H04N 7/18* | (2006.01) | |
| *H04N 17/00* | (2006.01) | |
| *H04W 24/08* | (2009.01) | |
| *H04W 24/10* | (2009.01) | |
| *H04W 28/02* | (2009.01) | |
| *H04W 36/00* | (2009.01) | |
| *H04W 36/30* | (2009.01) | |
| *H04W 52/02* | (2009.01) | |
| *H04W 72/04* | (2009.01) | |
| *H04N 7/14* | (2006.01) | |
| *H04N 19/00* | (2014.01) | |

(52) U.S. Cl.
CPC .  *G08B 13/19656* (2013.01); *G08B 13/19669* (2013.01); *G08B 13/19695* (2013.01); *G08B 21/182* (2013.01); *G08B 27/006* (2013.01); *G08B 29/183* (2013.01); *H04B 17/318* (2015.01); *H04B 17/391* (2015.01); *H04L 1/0003* (2013.01); *H04L 1/0009* (2013.01); *H04L 1/0017* (2013.01); *H04L 1/0033* (2013.01); *H04L 5/0053* (2013.01); *H04L 43/0858* (2013.01); *H04L 43/12* (2013.01); *H04L 43/16* (2013.01); *H04L 65/4084* (2013.01); *H04L 65/608* (2013.01); *H04L 65/80* (2013.01); *H04L 67/1093* (2013.01); *H04N 5/23206* (2013.01); *H04N 5/23227* (2018.08); *H04N 5/23254* (2013.01); *H04N 5/247* (2013.01); *H04N 7/12* (2013.01); *H04N 7/183* (2013.01); *H04N 17/002* (2013.01); *H04N 19/103* (2014.11); *H04N 19/124* (2014.11); *H04N 19/156* (2014.11); *H04N 19/184* (2014.11); *H04N 19/40* (2014.11); *H04N 19/42* (2014.11); *H04W 24/08* (2013.01); *H04W 24/10* (2013.01); *H04W 28/021* (2013.01); *H04W 36/0011* (2013.01); *H04W 36/30* (2013.01); *H04W 52/0245* (2013.01); *H04W 52/0261* (2013.01); *H04W 72/042* (2013.01); *H04W 72/0453* (2013.01); *H05B 47/105* (2020.01); *H05B 47/19* (2020.01); *G06T 2207/30232* (2013.01); *G06T 2207/30241* (2013.01); *H04N 7/147* (2013.01); *H04N 7/181* (2013.01); *H04N 19/00* (2013.01)

(56) References Cited

U.S. PATENT DOCUMENTS

| | | | |
|---|---|---|---|
| 2013/0128947 A1* | 5/2013 | Fryer | H04N 21/2402 375/240.01 |
| 2015/0312572 A1* | 10/2015 | Owen | H04N 19/102 375/240.02 |
| 2016/0105644 A1 | 4/2016 | Smith et al. | |
| 2016/0125714 A1 | 5/2016 | Kates et al. | |

OTHER PUBLICATIONS

Ananthanarayanan, Ganesh , et al., "Real-time Video Analytics—the killer app for edge computing", Microsoft Research; IEEE Computer Society, Oct. 2017, 11 pages.

Girshick, Ross , "Fast R-CNN Object detection with Caffe", Microsoft Research, 2015, 30 pages.

Hosseini, Hossein , et al., "Attacking Automatic Video Analysis Algorithms: A Case Study of Google Cloud Video Intelligence API", University of Washington, Seattle, WA, Worcester Polytechnic Institute, Worcester, MA, Aug. 14, 2017, 12 pages.

* cited by examiner

ENCODER SELECTION BASED ON CAMERA SYSTEM DEPLOYMENT CHARACTERISTICS

CROSS-REFERENCE TO RELATED APPLICATION(S)

This application claims priority to U.S. Provisional Patent Application No. 62/633,017, entitled "Optimization and Testing of Wireless Devices," by Emmanuel et al., and filed on Feb. 20, 2018. The content of the above-identified application is incorporated herein by reference in its entirety.

TECHNICAL FIELD

The present disclosure relates to digital video encoding, and in particular video encoder selection for cameras.

BACKGROUND

Digital camera systems can implement encoders for video compression. A video encoder can include electronic circuitry and/or software configured to convert digital video from an initial format to a compressed format. Video compression is utilized to reduce an amount of data needed to represent captured video and thereby alleviate the amount of computing resources needed to store, transfer, or otherwise utilize the captured video. Many different types of video encoders have been developed to suit various applications such as digital cameras/camcorders, digital video disk players, digital cable television, Internet video streaming, digital video conferencing, IP security cameras, etc.

DETAILED DESCRIPTION

Overview

Figure 1:
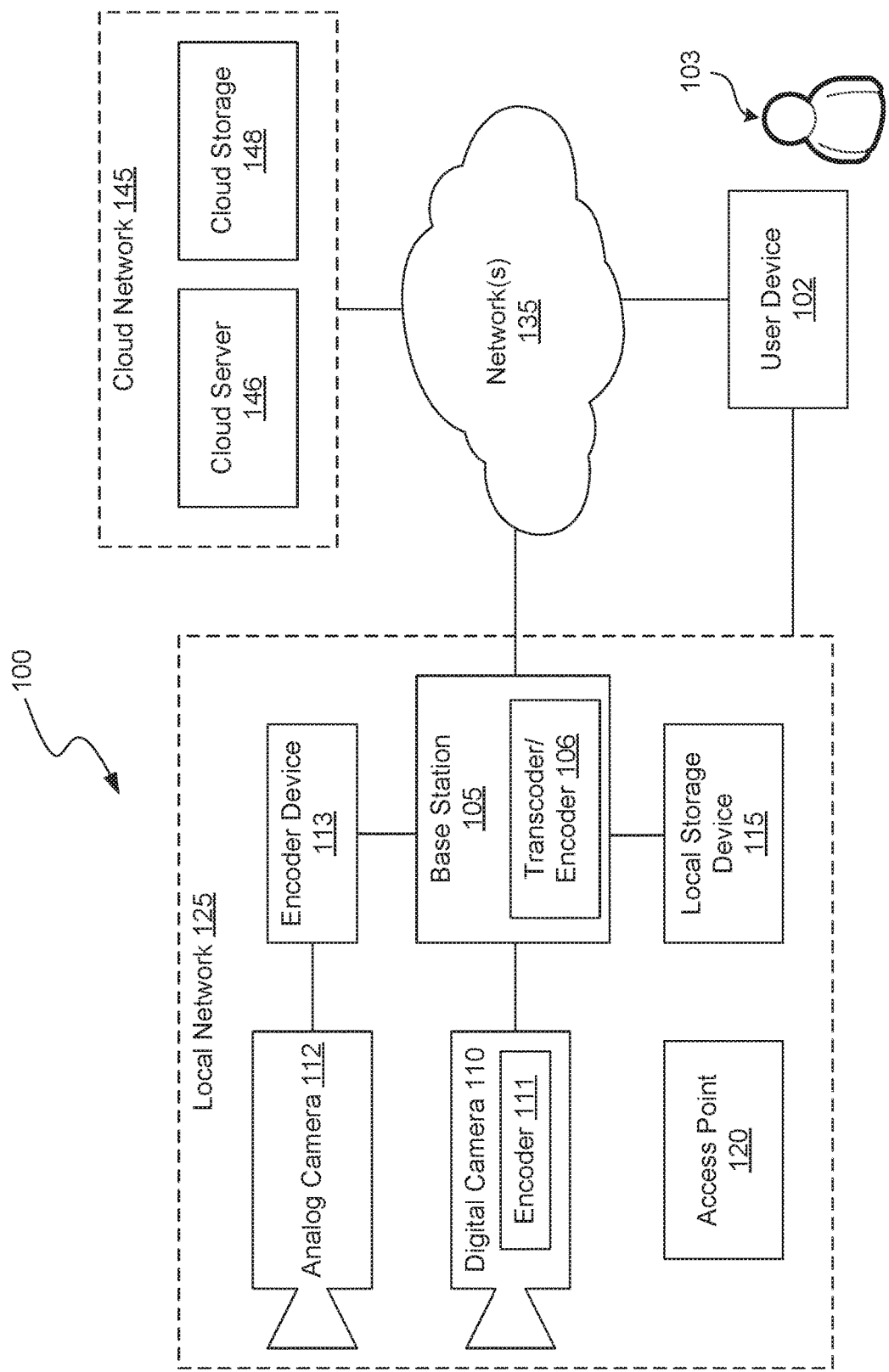
FIG. 1 is a block diagram illustrating an example: environment in which the introduced technique for encoder selection can be implemented.

Different video encoders can exhibit different characteristics such as compression efficiency, video quality, implementation complexity, energy usage, data loss resiliency, media format compatibility, required read/write speed, network throughput, etc. Selecting an appropriate encoder to implement in a given camera system can prove challenging, particularly where conditions are dynamically changing over time.

Introduced herein is a technique that addresses the challenge of encoder selection in a network-connected camera system. Specifically, introduced herein is a technique for selecting an encoder for encoding video captured by cameras in a camera system based on inputs indicative of characteristics of deployment of the camera system. Characteristics of deployment the camera system may include, for example capabilities and/or operation state of components (e.g., cameras, communications devices, storage devices, etc.) comprising the camera system, characteristics of the physical environment viewed by e cameras (i.e., scene), capabilities and/or operation state of devices (i.e., user devices) user to view video captured by the cameras, capabilities and/or operation state of networks over which video is communicated, costs associated with the transfer and/or storage of captured video (e.g., cloud provider throughput and storage costs), costs associated with implementing encoders in a given location (e.g., region specific royalty fees), user subscription features, user preferences, etc.

The process of selecting an encoder may, in some embodiments, actually include selecting or defining an "encoder profile." As used herein, the term "encoder profile" generally refers to a set of encoder parameters defining the coding tools and/or algorithms that can be used to encode video information. Such encoder parameters may include, for example, an encoding standard (e.g., H.264, H.265, VP8, VP9, Daala, MJPEG, MPEG4, WMV, etc.), a video codec based on any of the aforementioned standards, as well as various configuration options available for the selected video codec. Configuration options for any given codec may include, for example, video output format (e.g., .AVI, .MP4, MOV, .WMA, .MKV, etc.), video output resolution, video output bitrate, speed control parameters to manage quality vs. speed during the encoding process, encoding techniques or algorithms to apply (e.g., context-based adaptive variable-length coding (CAVLC), context-based adaptive binary arithmetic coding (CABAC), etc.), rate control parameters (e.g., variable bitrate (VBR), constant bitrate (CBR), constant rate factor (CRF), constant quantization parameter (constant QP), etc.), one pass vs. multi-pass encoding, and any other such parameters that define the how a piece of video information is to be encoded. Accordingly, any reference to selecting an "encoder" shall be understood to include selecting an "encoder profile" or otherwise setting or defining values for parameters included in the "encoder profile."

In some embodiments, an encoder may be selected based on inputs received at a time of installation of a camera system. Encoder selection may also dynamically change over time to adapt to changes in certain time varying inputs. For example, certain inputs such as camera capabilities may not change over time unless the cameras are changed. In contrast, other inputs such as network speed, scene viewed by the cameras, camera battery life, fees, etc. may change over time. Encoder selection may be performed continually, for example, periodically based on a set schedule. Alternatively, or in addition, encoder selection may be triggered in response to events such as detected network fluctuations or changes in a user subscription plan. In camera systems that include multiple cameras, encoder selections may apply system wide or may be applied on a per-camera basis based on particular characteristics of deployment of each camera. In some embodiments, machine learning can be implemented, for example, to optimize encoder selection and or as part of a process of determining the characteristics of deployment of the camera system. For example, machine learning may be applied along with computer vision techniques to develop scene understanding based on video captured by cameras in the camera system.

Example Operating Environment

FIG. 1 is a block diagram illustrating an example environment in which the introduced technique for encoder selection can be implemented. The example environment 100 includes a camera system including a base station 105 and one or more cameras such as digital camera 110 and analog camera 112. In some embodiments, the camera system is a security camera system that can be installed in a building such as a house. The base station 105 and the camera 110 can be connected to each other via a local network 125. The local network 125 can be a local area network (LAN). In some embodiments, the local network 125 is a wireless LAN (WLAN), such as a home created by one or more accesses point 120. The camera 110 and the base station 105 can be connected to each other wirelessly, e.g., over Wi-Fi, or using wired means. The base station 105 and the cameras 110/112 can be connected to each other wirelessly via the one or more access points 120, or directly with each other without the access point 120, e.g., using Wi-Fi direct, Wi-Fi ad hoc or similar wireless connection technologies or via wired connections. Further, the base station 105 can be connected to the local network 125 using a wired means or wirelessly.

The cameras 110/112 capture video and transmit the video to the base station 105, for example, as a video stream. The cameras 110/112 encode captured video using an encoder component. In some embodiments, certain cameras may include integrated encoder components such as the digital camera 110 with integrated encoder 110. Alternatively, or in addition, the encoder component may be a separate device such as encoder device 113. For example, an analog camera 112 may be communicatively coupled to the base station 105 via an analog to digital encoder device 113. In some embodiments, encoder component 106 may be integrated into the base station 105. For example, analog camera 112 may directly transmit analog video to the base station (e.g., via a wired connection) which is then encoded into digital information by encoder 106.

Generally, "encoding" refers to converting video information from an un-compressed un-encoded format (e.g., analog) into compressed encoded format. This is distinguished from "transcoding" which generally refers to the converting of video information from one compressed encoded format to a different compressed encoded format. However, both processes may involve the coding of information. Accordingly, although components 111 and 113 are referred to as "encoders" they may be configured to perform other processes such as transcoding and/or decoding. Encoding, decoding, and transcoding may in some instances be collectively referred to herein as "coding."

Encoders 111, 113, 106 may include any combination of software and/or hardware configured to encode video information. Such encoders may be based on any number of different standards such as H.264, H.265, VP8, VP9, Daala, MJPEG, MPEG4, WMV, etc. for encoding video information. Accordingly, depending on the codec used, the video stream from a given camera to the base station 105 may be one of several different formats such as .AVI, .MP4, MOV, .WMA, .MKV, etc. The video stream can include audio as well if the camera 110/112 includes or is communicatively coupled to an audio device (e.g., a microphone).

The cameras 110/112 can be battery powered or powered from a wall outlet. In some embodiments, the cameras 110/112 can include one or more sensors such as motion sensors that can activate the recording of the video when motion is detected. The cameras 110/112 can include infrared (IR) light emitting diode (LED) sensors, which can provide night-vision capabilities. Although the example environment 100 illustrates a single digital camera 110 and a single analog camera 112, the camera system can include just one camera or multiple cameras (which can be installed at various locations of a building) of either type. For example, in a particular embodiment, the camera system includes multiple digital cameras 110 wirelessly coupled to the base station 105 via the local network 125. Further, all the cameras in the camera system can have same features, or at least some of the cameras can have different features. For example, one camera can have a night-vision feature while another may not. One camera can be battery powered while another may be powered from the wall outlet.

The base station 105 can be a computer system that securely connects the cameras 110/112 to an external network 135, for example, via one or more access points 120. The external network 135 may comprise one or more networks of any type including packet switched communications networks, such as the Internet, Worldwide Web portion of the Internet, extranets, intranets, and/or various other types of telecommunications networks such as cellular phone and data networks, plain old telephone system (POTS) networks, etc.

The base station 105 can provide various features such as long range wireless connectivity to the camera 110, a local storage device 115, a siren, connectivity to network attached storage (NAS) and enhance battery life of cameras 110/112, e.g., by making the cameras 110/112 work efficiently and keeping the communications between the base station 105 and the cameras 110/112 efficient. The base station 105 can be configured to store the video captured from the cameras 110/112 in any of the local storage device 115, a NAS, or a cloud storage 148. The base station 105 can be configured to generate a sound alarm from the siren when an intrusion is detected by the base station 105 based on the video streams receive from cameras 110/112.

Another feature of the base station 105 is that it can create its own network within the local network 125, so that the camera 110 may not overload or consume the network bandwidth of the local network 125. The camera 110 typically connects to the base station 105 wirelessly. In some embodiments, the local network 125 can include multiple base stations to increase wireless coverage of the base station 105, which may be beneficial or required in cases where the cameras are spread over a large area.

In some embodiments the local network 125 can provide wireless coverage to user devices (e.g., user device 102), for example, via access points 120. In the example environment 100 depicted in FIG. 1, a user device 102 can connect to the base station 125, for example, via the local network 125 if located close to the base station 105 and/or via network 135 (e.g., the Internet). The user device 102 can be any computing device that can connect to a network and play video content, such as a smartphone, a laptop, a desktop, a tablet personal computer (PC), or a smart TV.

In an example embodiment, when a user 103 sends a request (e.g., from user device 102), to view a live video feed from any of cameras 110/112, the base station 105 receives the request and in response to receiving the request, obtains the encoded video stream(s) from the cameras 110/112 and streams the encoded video to the user device 102 for viewing. Upon receiving the encoded video stream at the user device 102, a video player application in the user device 102 decodes the encoded video stream and plays the video on a display on the user device 102 for the user 103 to view.

As previously mentioned, in some embodiments, the base station 105 may include an encoding component such as encoder/transcoder 106 that performs a coding process on video received from the cameras before streaming to the user device 102. In an example embodiment, a transcoder 106 at the base station 105 transcodes a video stream received from a camera 110, for example, by decoding the encoded stream and re-encoding the stream into another format to generate a transcoded video stream that is then stream to the user device 102.

The video stream received at the user device 102 may be a real-time video stream and/or a recorded video stream. For example, in some embodiments, the transcoder 106 may transcode an encoded video stream received from a camera 110/112 and stream the transcoded video stream to the user device 102 in real-time or near real-time (i.e., within several seconds) as the video is captured at the camera 110/112. Alternatively, or in addition, the video streamed by base station 105 to the user device may be retrieved from storage such as local storage 115, cloud storage 148, or some other NAS.

The base station 105 can stream video to the user device 102 in multiple ways. For example, the base station 105 can stream video to the user device 102 using peer-to-peer (P2P) streaming technique. In P2P streaming, when the video player on the user device 102 requests the video stream, the base station 105 and the user device 102 may exchange signaling information, for example via network 135 or a cloud network 145, to determine location information of the base station 105 and the user device 102, to find a best path and establish a P2P connection to route the video stream from the base station 105 to the user device 102. After establishing the connection, the base station 105 streams video to the user device 102, eliminating the additional bandwidth cost to deliver the video stream from the base station 105 to a video streaming server 146 in a cloud network 145 and for streaming from the video streaming server 146 to the user device 102. In some embodiments, a server 146 in the cloud network may keep a log of available peer node servers to route the video stream and establish the connection between the user device 102 and other peers. In such embodiments, instead of streaming video, the server 146 may function as a signaling server or can include signaling software whose function is to maintain and manage a list of peers and handle the signaling between the base station 105 and the user device 102. In some embodiments, the server 146 can dynamically select the best peers based on geography and network topology.

In some embodiments, the cloud network 145 is a network of resources from a centralized third-party provider using Wide Area Networking (WAN) or Internet-based access technologies. Cloud networking is related to the concept of cloud computing, in which the network or computing resources are shared across various customers or clients. The cloud network 145 is distinct, independent, and different from that of the local network 125.

Figure 2:
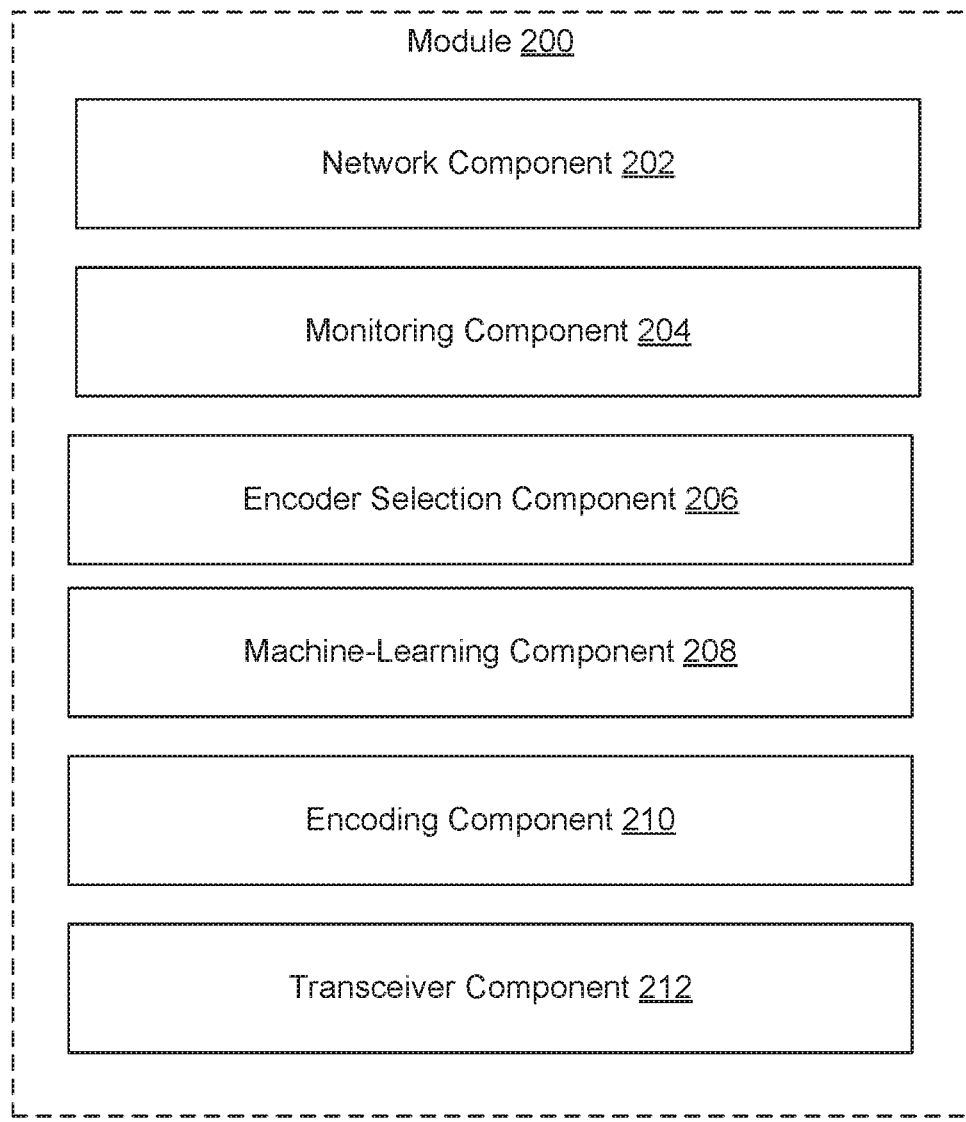
FIG. 2 is a block diagram illustrating an example module for implementing the introduced technique for encoder selection.

FIG. 2 is a block diagram of an example module 200 for implementing the introduced technique for encoder selection. The example module 200 may include multiple functional components including a network component 202, a monitoring component 204, a coding profile selection component 206, a machine-learning component 208, an encoding/transcoding component 210, and a transceiver component 212.

The network component 202 establishes the connection with the local network 125, and between the base station 105 and the one or more cameras 110/112.

The monitoring component 204 monitors for inputs, for example inputs indicative of characteristics of the deployment of cameras 110/112, that can be used in selecting a coding profile, for example, for encoding, decoding, and/or transcoding video at a camera 110, at a separate encoder device 113, or at the base station 105 based on the inputs.

The encoder selection component 206 receives the inputs gathered by the monitoring component 204 and selects appropriate encoders based on the received inputs. Coding profiles may be selected and applied for use in encoding video at all cameras in a given camera system or on per-camera basis depending on deployment characteristics.

A machine-learning component 208 can implement one or more types of machine learning techniques, for example, to assist in the identification of inputs indicative of characteristics of deployment of the cameras 110//112 in a camera system and/or in the adaptive selection coding profiles based on such inputs. Machine learning techniques that can be implemented may include one or more of supervised and unsupervised modeling techniques, such as, linear regression, logistic regression, Naïve Bayes, decision trees, random forests, support vector machines, kmeans, hierarchical clustering, association mining, time series modeling techniques, Markovian approaches, text mining models, stochastic modeling techniques, neural networks, etc.

An encoding/transcoding component 210 utilizes the coding profile selected by the coding profile selection component 206 to encode, decode, and/or transcode video information using the selected profiles, for example, using one or more codecs.

The transceiver component 212 may receive requests for video streams, for example, from a user device, and cause the transmitting of requested streams (e.g., live streams from cameras 110/112 and/or recorded streams from storage) to the requesting user device for viewing.

The module 200 depicted in FIG. 2 depicted in FIG. 2 is an example provided for illustrative purposes and is not to be construed as limiting. Other embodiments may include more or fewer components than as depicted in FIG. 2 and/or may group components differently. For example, in some embodiments, monitoring and encoder selection may be conceptualized as a single component instead of separate components of a module. Functionality associated with the various components of example module 200 may be implemented using one or more computing systems such as the example computing system 1200 described with respect to FIG. 12. For example, functionality may be implemented using instructions stored in memory that are then executed by a processor of a computing system. In some embodiments, the functionality associated with the various components of example module 200 may be implemented using any combination of software and/or hardware at any of the entities (e.g., devices, services, etc.) described with respect to the example environment 100 shown in FIG. 1. For example, in some embodiments, module 200 may be implemented in hardware and/or software at the base station 105 and/or in a cloud computing environment associated with cloud network 145. Alternatively, functionality associated with different components may be distributed across the various entities described with respect to the example environment 100 shown in FIG. 1. For example, monitoring and encoder selection may be performed at the base station using machine learning processes performed in the cloud network 145 to select and encoders to implement at cameras 110 and/or separate encoder devices 113.

Figure 3:
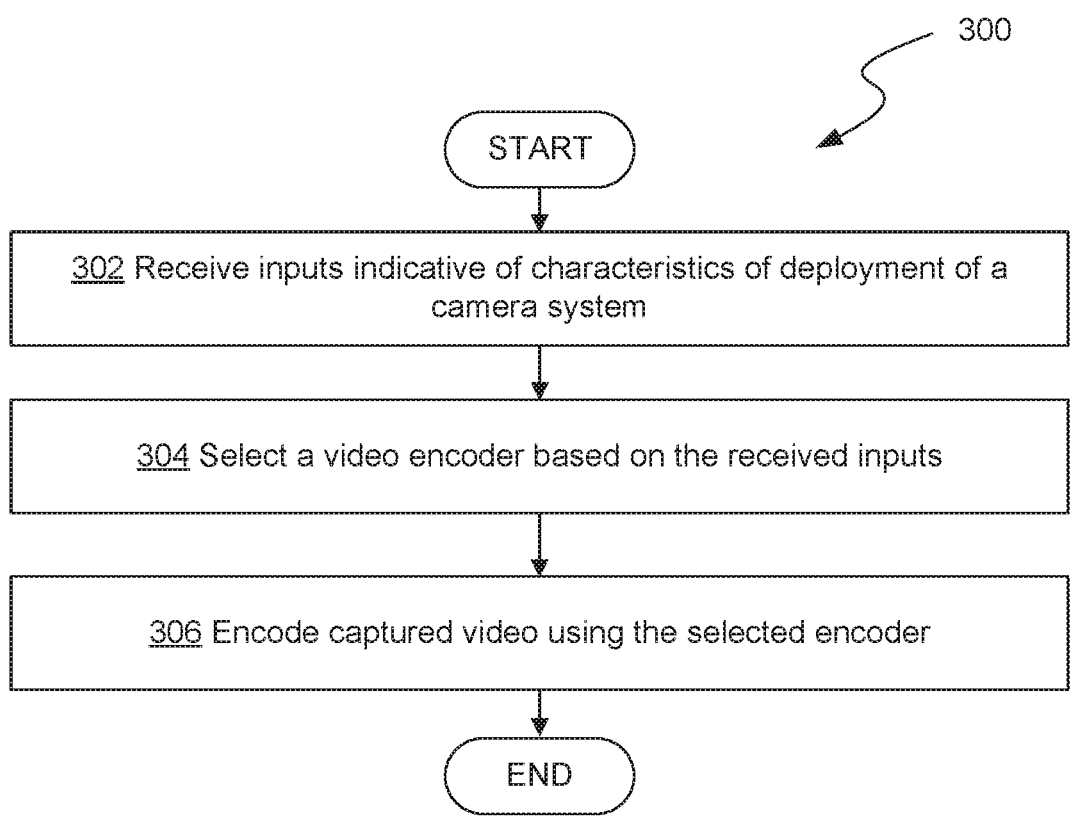
FIG. 3 is a flow diagram of an example process for selecting an encoder based on characteristics of deployment of a network-connected camera system.

Example Process for Encoder Selection Based on Camera System Deployment Characteristics FIG. 3 shows a flow chart of an example process 300 for encoder selection based on camera system deployment characteristics. For illustrative clarity, the example process is described as being performed by a computing system (e.g., such as computing system 1200 described with respect to FIG. 12). For example, the process depicted in FIG. 3 may be represented in instructions stored in memory that are then executed by a processor. A person having ordinary skill in the art will understand that the components of such a computing system may be distributed across one or more entities of the example environment 100 described with respect to FIG. 1. The process 300 described with respect to FIG. 3 is an example provided for illustrative purposes and is not to be construed as limiting. Other processes may include more or fewer steps than depicted while remaining within the scope of the present disclosure. Further, the steps depicted in example process 300 may be performed in a different order than is shown.

The example process 300 begins at step 302 with receiving inputs indicative of characteristics of deployment of camera system. As previously mentioned, characteristics of deployment a camera system may include, for example, capabilities and/or operation state of components cameras, communications devices, storage devices, etc.) comprising the camera system, characteristics of the physical environment viewed by the cameras (i.e., scene), capabilities and/or operation state of devices (i.e., user devices) user to view video captured by the cameras, capabilities and/or operation state of networks over which video is communicated, costs associated with the transfer and/or storage of captured video (e.g., cloud provider throughput and storage costs), costs associated with implementing encoders in a given location (e.g., region specific royalty fees), user subscription features, user preferences, etc.

Figure 4:
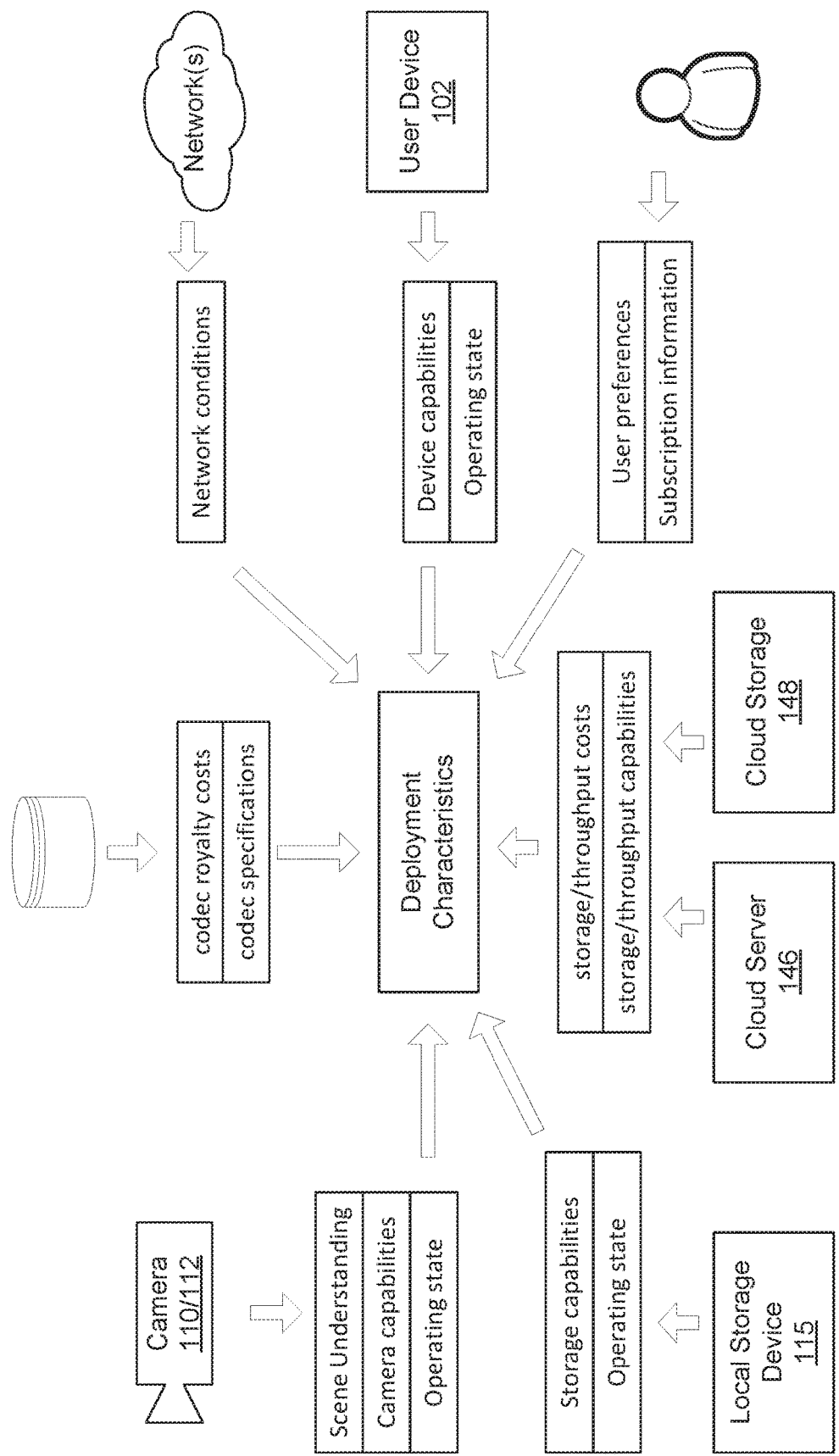
FIG. 4 is a block diagram that illustrates various sources of data indicative of characteristics of deployment of a network-connected camera system.

The inputs indicative of characteristics of deployment of camera system can be collected from any number of resources within and/or external to the camera system. FIG. 4 shows an illustrative diagram that shows how various example inputs can be sourced from different entities associated with the example environment 100 depicted in FIG. 1.

In some embodiments, step 302 may include receiving inputs entered by a user, for example, defining various parameters defining the devices or services associated with a camera system. For example, a user may enter inputs via a graphical display presented at a user device 102 that specifies the cameras 110/112 that are part of the camera system, a device is utilized to access video captured by the camera system, various user preferences associated with the capture and viewing of video and/or information (e.g., account information) associated with a subscription service used to access captured video.

Alternatively, or in addition, step 302 may include automatically retrieving, by a computing system, inputs from any of entities associated with example environment 100. For example, if the computing system performing example process is located at a base station 105, step 302 may include communicating with the various devices connected to the local network 125, for example, to retrieve information indicative of the capabilities (e.g., resolution, available codecs, uplink speed, etc.) and/or current operating state (e.g., remaining battery life) of each of the connected cameras 110/112, retrieve information indicative of the capabilities (e.g., write speed) and/or current operating state (e.g., available storage space) of local storage devices 115, retrieve information indicative of the capabilities (e.g., operating system, available codecs, display size, network connection, etc.) and operating state (e.g., computing resource usage, network connection state, etc.) indicative of the user device 102 requesting video, retrieve information indicative of the capabilities (e.g., storage/throughput) and costs associated with various cloud services utilized to deliver video to the user device 102, monitor the conditions (e.g., throughput, network speed, available bandwidth) on various networks utilized to deliver video, or any other similar information.

In some embodiments, step 302 may include accessing, by the computing system, a database (internal or external to the system) for various information relevant to the camera system deployment. For example, in some embodiments, step 302 may include determining a location of the camera system deployment (e.g., based on user inputs or localization techniques) and then accessing a database for information indicative of royalties attached to the use of certain codecs (or codec standards) at the location of the camera system deployment.

Any other type of information may similarly be stored in a database and accessed as needed. For example, the computing system may access information indicating a type of camera 110 deployed in the camera system, and utilize this information to cross reference other available information indicative of the camera type (capabilities etc.) stored in a separate database.

In some embodiments, step 302 may include analyzing video captured by the cameras 110/112 to identify characteristics of the surrounding physical environment. For example, computer vision techniques can be implemented to detect physical objects in video captured by the cameras 110/112, identify the detected objects, and thereby develop understanding of the scene captured in the video. This process may involve applying machine learning to improve scene understanding.

Example process 300 continues at step 304 with selecting an encoder based on the any one or more of the inputs received at step 302. In other words, step 304 may include processing data received as inputs at step 302 to select an encoder based on the inputs.

The process of selecting an encoder at step 304 can include selecting or defining an encoder profile that includes one or more encoder parameters. Such encoder parameters may include, for example, an encoding standard (e.g., H.264, H.265, VP8, VP9, Daala, MJPEG, MPEG4, WMV, etc.), a video codec based on any of the aforementioned standards, as well as various configuration options available for the selected video codec. Configuration options for any given codec may include, for example, video output format (e.g., .AVI, .MP4, MOV, .WMA, .MKV, etc.), video output resolution, video output bitrate, speed control parameters to manage quality vs. speed during the encoding process, encoding techniques or algorithms to apply (e.g., context-based adaptive variable-length coding (CAVLC), context-based adaptive binary arithmetic coding (CABAC), etc.), rate control parameters (e.g., variable bitrate (VBR), constant bitrate (CBR), constant rate factor (CRF), constant quantization parameter (constant QP), etc.), one pass vs. multi-pass encoding, and any other such parameters that define the how the video captured by cameras 110/112 is to be encoded.

In some embodiments, step 304 may include setting individual values for any of the aforementioned encoder parameters to define the encoder profile. Alternatively, or in addition, step 304 may include selecting from available predefined encoder profiles associated with certain codecs. For example, the H.264 codec standard includes multiple predefined encoder profiles (e.g., baseline, extended, main, high, progressive high, etc.) that target specific classes of applications.

Encoder selection may impact a number of different factors such as compression efficiency, video quality, implementation complexity, energy usage, data loss resiliency, media format compatibility, required read/write speed, network throughput, royalty costs, etc. For example, codecs based on certain standards may involve payment of royalties (e.g., H.265) while others are royalty free (e.g., VP8, VP9).

Codec selection may also impact various performance metrics. For example, VP9 based codecs may result in better compression than codecs based on the older H.264 standard; however, such VP9 codecs such as Libvpx are typically slower and output video that can be perceived as blurrier and overall not as visually appealing as video output using H.264 codecs. Within a standard, different codecs may exhibit different characteristics. For example, use of EVE (Efficient Video Encoder) for VP9 can result in 20% better compression at 20% faster speed when compared with Libvpx for VP9.

As previously mentioned, some codecs may provide options to apply different types of techniques or algorithms when encoding video. Choice of encoding technique to apply can impact certain performance metrics. For example, although results can vary based on the source video, CAVLC generally results in lower quality video when compared to CABAC. However, CAVLC can be easier to decode in some situations which can lessen processing resource requirements when playing back encoded video.

Encoding parameters such as rate control parameters can also impact certain performance metrics. For example, CRF (the default rate control mode for H.264 and H.265 encoders) aims to achieve a constant perceived quality level (based on an input parameter value). To achieve such constant quality, the CRF mode may vary compression of frames differently, thereby varying QP as necessary to maintain a certain level of perceived quality. Similarly, Constant QP aims to maintain a constant quantization parameter which defines how much information to discard from a given block of pixels in a frame and can result in widely varying bitrates over a sequence of frames.

Another important factor to consider is the ability of a user device 102 to playback video encoded based on a selected encoder. Support for various codec and video format combinations may vary among different user device platforms. For example, user devices implementing previous generation operating systems (e.g., Microsoft Windows™ 8.1 or lower, Apple™ macOS Sierra (10.12) or lower, Apple™ iOS 10 or lower, or Android 4.4.4 or lower may not be have the capability to open and play HEVC encoded .mov videos. Other codec and or video formats may have similar device platform compatibility issues.

Figure 5:
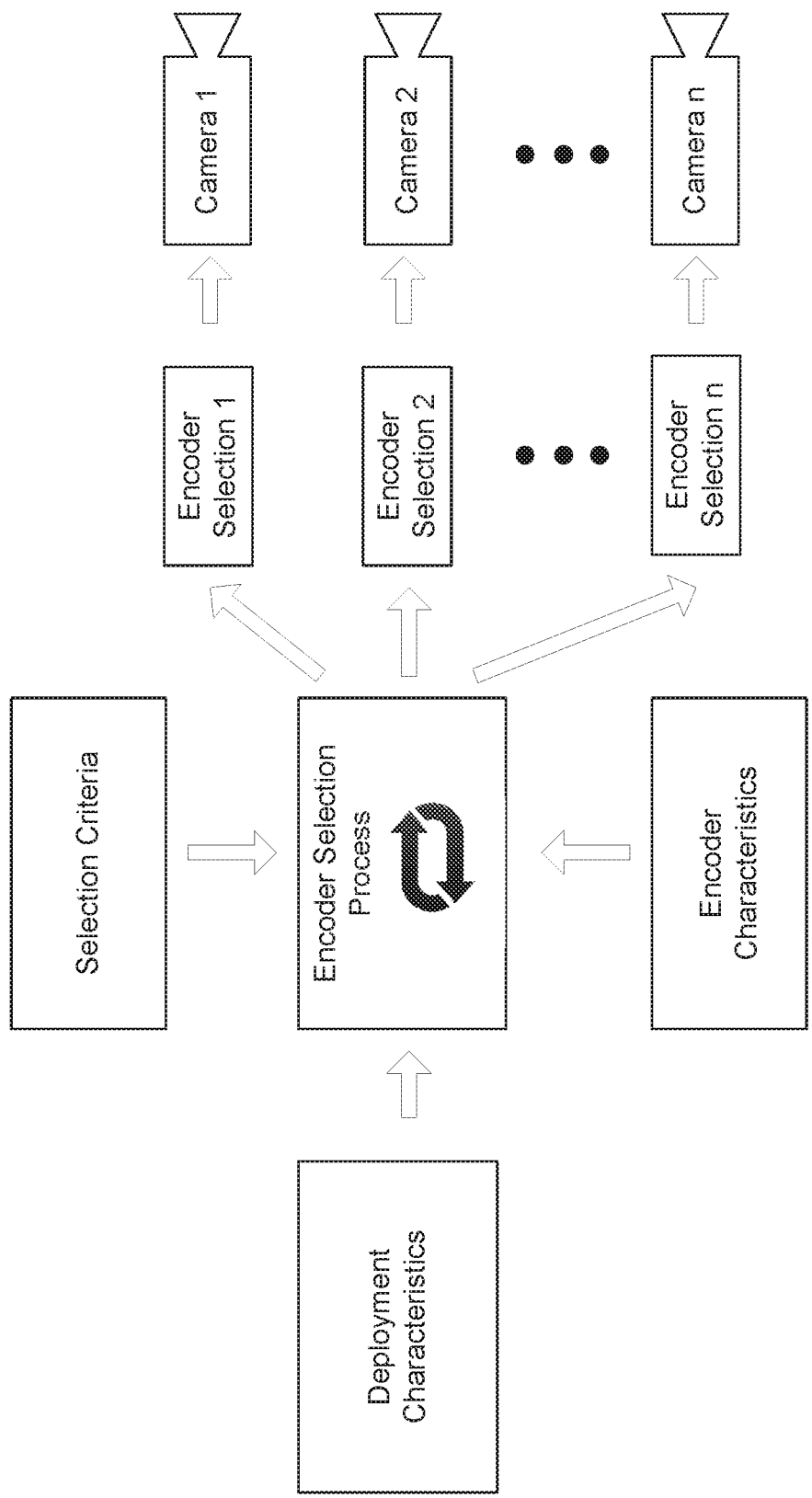
FIG. 5 is a block diagram that illustrates how various inputs can be processed to select an encoder.

In some embodiments, the encoder selection process may operate as optimization process to select encoders for the one or more cameras 110/112 in the camera system that most closely match some set of one or more selection criteria based on the input characteristics of deployment of camera system and characteristics of any of the available encoder tools. FIG. 5 shows a high-level diagram that illustrates how various inputs such as the camera system deployment characteristics, encoder characteristics can be processed to select encoders for each of several cameras in a camera system that will most closely achieve some set of one or more selection criteria.

Selection criteria in this context may include, for example, user device compatibility criteria, video quality based criteria (e.g., minimum quality, range of acceptable quality, etc.), latency based criteria (e.g., maximum delay, range of acceptable delay, etc.), resource usage criteria (e.g., maximum file size, maximum CPU usage, maximum memory usage, etc.), cost based criteria (e.g., royalty-free, maximum royalty costs, maximum cloud costs, etc.), user subscription criteria (e.g., required user permission level, or any other type of criteria upon which an assessment for encoder selection can be based.

Selection criteria can be specified at system installation and remain static or can be dynamically adjusted over time, for example, based on user input preferences, system-provider updates, and/or in response to machine learning. For example, a processing system implementing the encoder selection process may identify, through machine learning techniques, that applying certain selection criteria in selecting encoders leads to better results in perceived quality, overall system performance, implementation costs, or any other metric.

In some embodiments, multiple selection criteria may be weighted differently when applied during the encoder selection process. For example, certain selection criteria deemed more important (e.g., device compatibility) may be weighted more heavily than other selection criteria (e.g., resource usage).

As previously mentioned, in some embodiments, the encoder selection process at step 304 may be performed once at system installation, continually during operation of the camera system, and/or in response to specific inputs such as user inputs to select new encoders or events automatically generated in response to detected activity associated with the camera system. For example, in some embodiments, the encoder selection process may be performed periodically (i.e., continually) according to a set schedule (e.g., hourly, daily, weekly, etc.) to automatically update encoder selections, for example, according to changes in deployment characteristics of the camera system (e.g., changes camera arrangement, changes in network conditions, changes in available local storage, etc.), changes in selection criteria (e.g., adding/deleting certain criteria, changes in criteria weighting, etc.), or changes in encoder characteristics (e.g., updated specifications, updates in learned characteristics, new encoder technology standards, etc.). Alternatively, or in addition, performance of the encoder selection process may be automatically triggered in response to detection of certain events such as a new camera 110 connecting to base station 105, a detected dip in network speed, indication of low battery life at a camera 110, available space in local storage 115 falling below a threshold level, a new user device 102

(with different capabilities) connecting to the base station 105 access video, or any other types of events.

Returning to FIG. 3, with an encoder selected, example process 300 continues to step 306 with encoding video captured by a camera 110/112 using the selected encoder. In some embodiments, step 306 may include transmitting, by a processing system performing the selection process, information indicative of the encoder selection to another processing system that then performs the video encoding according to the selection. For example, a processing system at base station 105 may select encoders for each of the one or more cameras 110/112 comprising the camera system and then transmit information indicative of the selection to another processing system (e.g., integrated at a digital camera 110 or in a separate encoder device 113) for use in performing the video encoding. Alternatively, or in addition, both steps 304 and 206 may be performed by the same processing system, for example at a camera 110, base station 105, or at a cloud server 146. In some embodiments, information indicative of the selected encoder may include one values for one or more encoder parameters that are configured to be utilized by an encoder tool performing the video encoding.

In some embodiments, step 306 may include accessing available encoder tools to encode the captured video based on the encoder selection. This can include accessing or otherwise implementing encoder tools using existing hardware and/or software resources available in the system (e.g., integrated into any of cameras 110, encoder device 113, base station 105, etc.). If certain necessary resources (e.g., a software codec) are not currently available in the system, step 306 may include accessing an entity external to the system for the necessary resource. For example, if a particular software codec is needed to implement an encoder selection, step 306 may include automatically downloading, by the base station 105, via a network 135 (e.g., the Internet), the particular software codec from an external repository (e.g., a codec provider) and storing the downloaded software codec in memory for execution using a processing system. Similarly, any of the other devices, including network-connected cameras 110, may directly access outside systems to download necessary encoder resources.

Encoder Selection Based on Scene

In some embodiments, encoder selection may be based at least in part on the type of scene being captured by any one of the cameras 110/112 of a camera system. The reasoning behind such selection criteria includes the manner in which the human eye perceives objects in the physical environment. For example, the human eye generally perceives more detail in still objects than in similar objects that are in motion. Similarly, the human eye can perceive more detail in objects that are relative close than in similar objects that are relatively far. Based on such facts, assumptions can be made regarding a level of detail necessary when encoding certain scene types.

Figure 6:
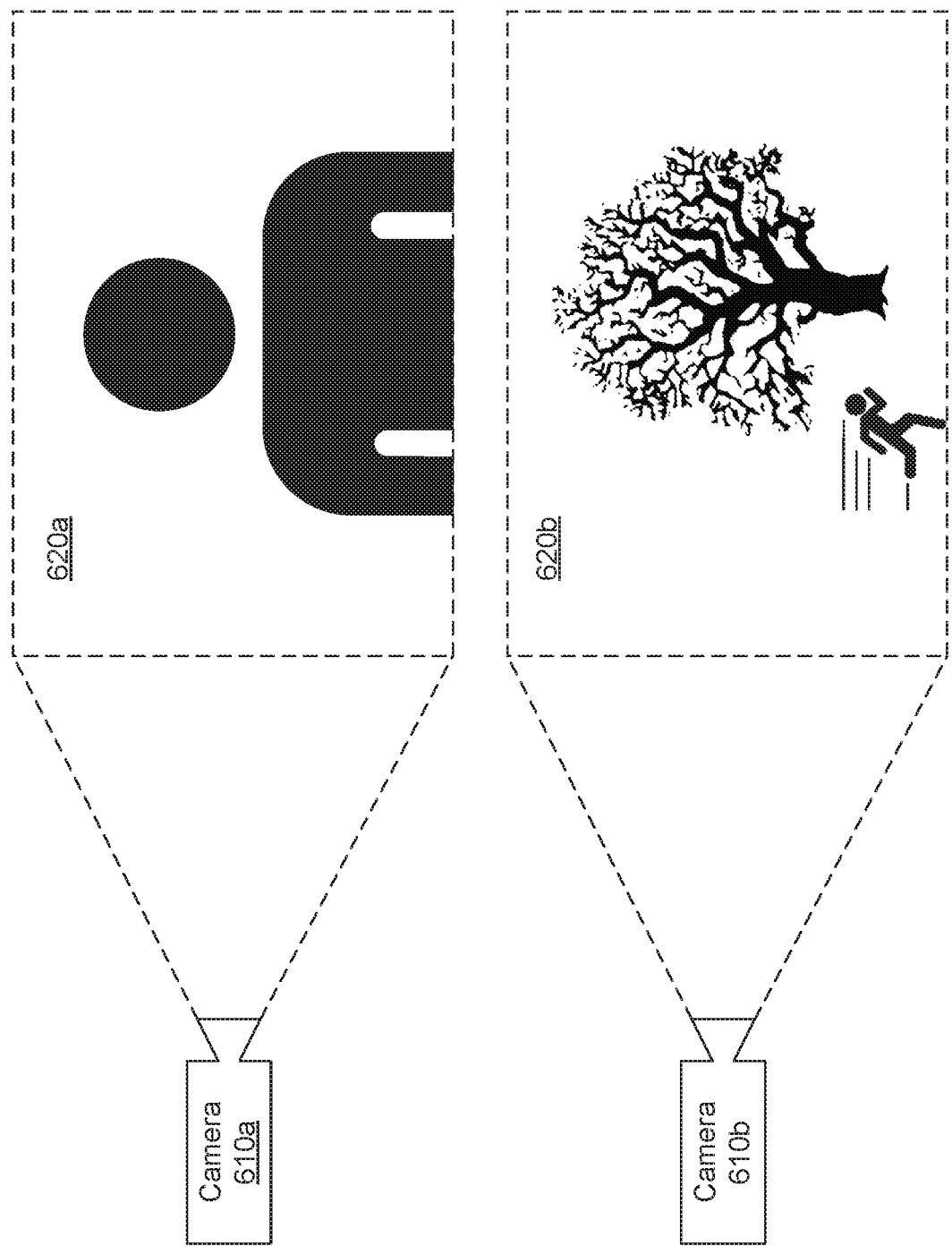
FIG. 6 is a diagram that illustrates different scenes captured by different cameras in a network-connected camera system.

Consider, for example, the diagram depicted in FIG. 6 that shows a first camera 610a capturing a first scene 620a and a second camera 610b capturing a second scene 620b. As depicted, the two captured scenes may vary in one or more characteristics. Scene 620a includes a close-up of a human subject, while scene 620b includes a wider field with a human subject in motion. Accordingly, the human eye may require a higher level of detail in captured video of scene 620a than in the captured video of 620b. Such an assumption can inform the selection criteria to select different encoders to process video captured by the two cameras.

In an illustrative real-world example, the two cameras shown in FIG. 6 may be part of a network-connected residential video surveillance camera system with the first camera 610a installed at front door entrance to the residence and camera 610b installed in a backyard. Although the scene captured at any particular camera may change continually over time, certain patterns may emerge based on the characteristics of the deployment of the cameras. For example, camera 610a installed at the front door entrance to the residence may tend to capture close-up shots of people coming to the door of the residence while camera 610b installed in the backyard may tend to capture distant still objects (e.g., trees) along with distant objects in motion (e.g., a person running, etc.).

In a video surveillance scenario, details may be particularly important to a user viewing video captured by the first camera 610a because the camera is deployed to capture close-ups of people at the front door entrance. For example, camera 610a may capture video of a face of an intruder. Accordingly, an encoder may be selected to encode video captured by camera 610a to achieve higher levels of detail possibly at the expense of other criteria such as file size, latency, etc. In this particular scenario an H.264 encoder using constant QP may be a good option for cameras in a video surveillance system that are deployed at a front entrance or that otherwise tend to capture close-up video of people (particularly faces). Conversely, an encoder that applies higher compression (at the expense of detail) can be selected for processing video captured by camera 610b camera 610b deployed in a backyard of the residence.

In some embodiments, a user (e.g., end user or installer) may specify the type of scene a camera is intended to capture when installing the camera, for example, by entering inputs via a graphical user interface at a user device. In the case of camera 610a, a user may input information to the system indicating that the camera 610a is installed at the front door. Such information may be used as an input indicative of deployment characteristics of the camera system in the encoder selection process. The user may also update entered information by providing new inputs via a similar interface during operation of the camera system.

Figure 7:
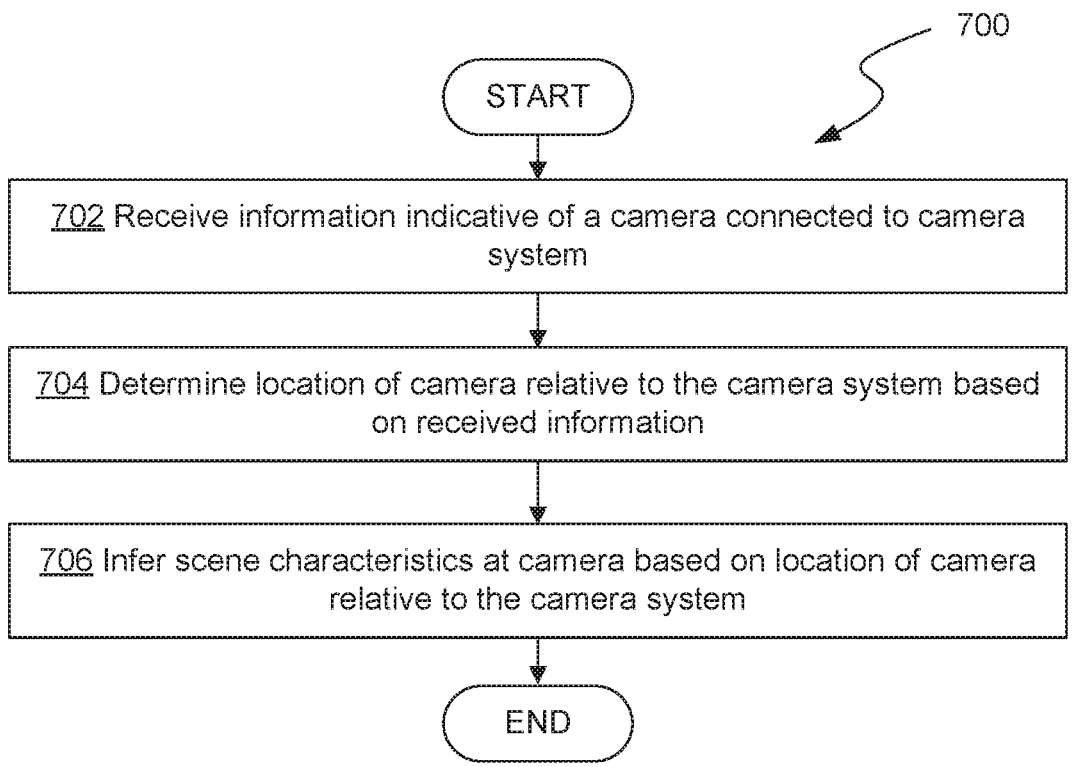
FIG. 7 is a flow diagram of an example process for inferring scene characteristics based on a location of a camera relative to a network-connected camera system.

In some embodiments, a processing system may infer information indicative of the scene captured by a particular camera based on other available information, such as a camera type or a location of the installed camera. For example, FIG. 7 shows a flow chart of an example process 700 for inferring scene characteristics based on the location of a camera. At step 702 a processing system receives information indicative of a camera connected to the camera system. For example, this information may be received in response to detecting a new camera 110 wirelessly connecting to base station 105. At step 704, the processing system determines a location of the camera relative to the camera system based on the received information. For example, the received information may include location information (e.g., if the camera includes a GPS receiver) and/or other information (e.g., wireless signals) that can be utilized to resolve the location of the camera using wireless network localization techniques such as time of arrival (TOA), received signal strength (RSS), time difference of arrival (TDOA), etc. At step 706, the processing system infers certain scene characteristics based on the location of the camera relative to the camera system. This inference may also be based on other information, for example entered by a user, specifying characteristics of the environment within which the camera system resides. As an illustrative example, a processing system may determine a location of a camera 110 relative to a base station 105 and infer that the camera is located at a front door entrance of a residence, for example, based on a known location of the base station 105. Based on this inference, the processing system may determine that higher detail is necessary when encoding video and select an appropriate encoder to achieve such detail.

Computer vision can be applied to process video captured by the cameras to detect physical objects, identify or classify the detected objects, and thereby develop an understanding of the scene captured in the video. For example, a processing system applying computer vision techniques may process video captured by camera 610 over time to determine that camera 610 tends to capture close-up video of human subjects. Based on this information, the processing system may determine that higher detail is necessary when encoding video and select an appropriate encoder to achieve such detail.

Figure 8:
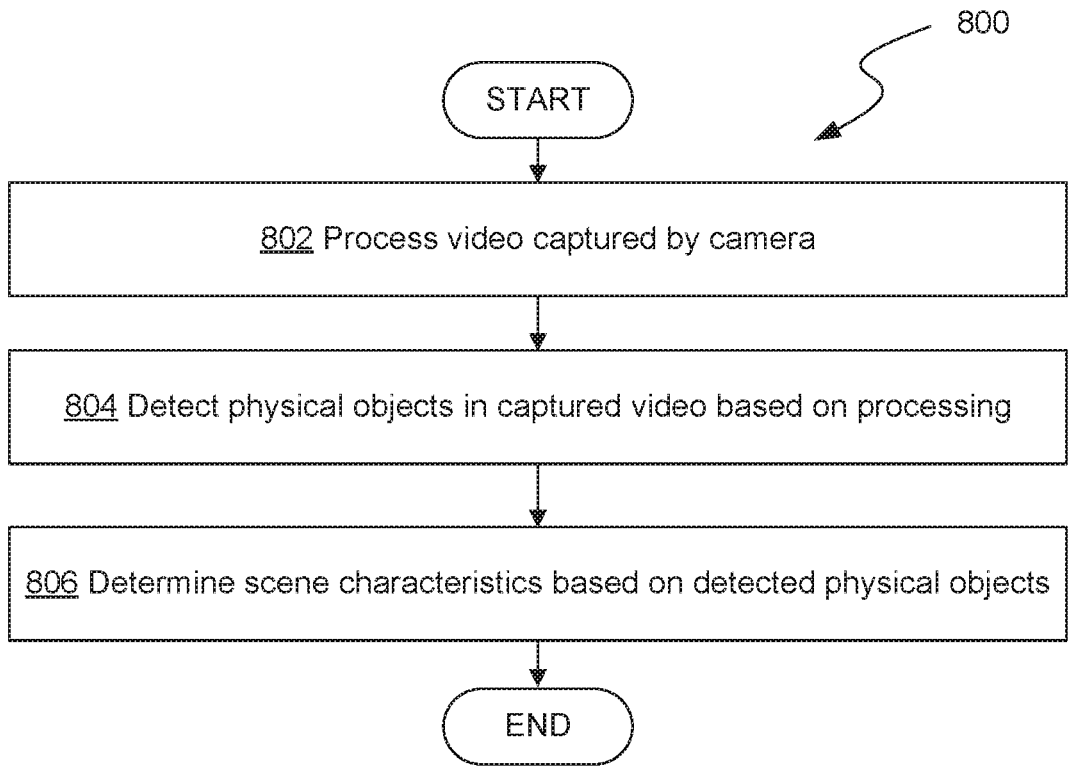
FIG. 8 is a flow diagram of an example process for determining scene characteristics using computer vision processing.

FIG. 8 shows a flow chart of an example process 800 for determining scene characteristics using computer vision. Example process 800 starts at step 802 with processing video captured by a camera, for example, using computer vision techniques. Process 800 continues at step 804 with detecting one or more physical objects in the captured video based on the processing. Detecting physical objects may include identifying, recognizing, and/or classifying the detected physical objects through observation, for example, using deep learning and neural networks. Next, at step 806, scene characteristics are determined based on the detected physical objects. For example, the processing system may determine that humans are in view, that objects are in motion, or any other characteristics regarding the scene in the captured video.

Computer vision can also be utilized to respond in real time or near real time (i.e., within a few seconds) to changes in the scene captured by cameras with changes in encoder selection. Using computer vision, a processing system may identify changes in characteristics of the captured scene such as when objects are still, when objects are moving, when certain object classes (e.g., humans) are present, etc. and respond to such changes with new encoder selections. For example, a processing system may select a first encoder to apply more compression when objects in the scene are moving and select a second encoder to apply less compression (resulting in more detail) when objects are still. Similarly, a processing system may select a first encoder to apply more compression when there are no detected humans in the video and select a second encoder to apply less compression (resulting in more detail) in response to detecting humans entering a field of view of a camera.

Encoder Selection Based on Player Device

In some embodiments, encoder selection may be based at least in part on the user device used to playback encoded video. As previously discussed, video encoded using certain codecs in certain formats may be incompatible with certain user device configurations (e.g., hardware and/or operating system). Accordingly, the characteristics of the one or more user devices utilized for playback of encoded video can represent an important criterion for encoder selection.

Figure 9:
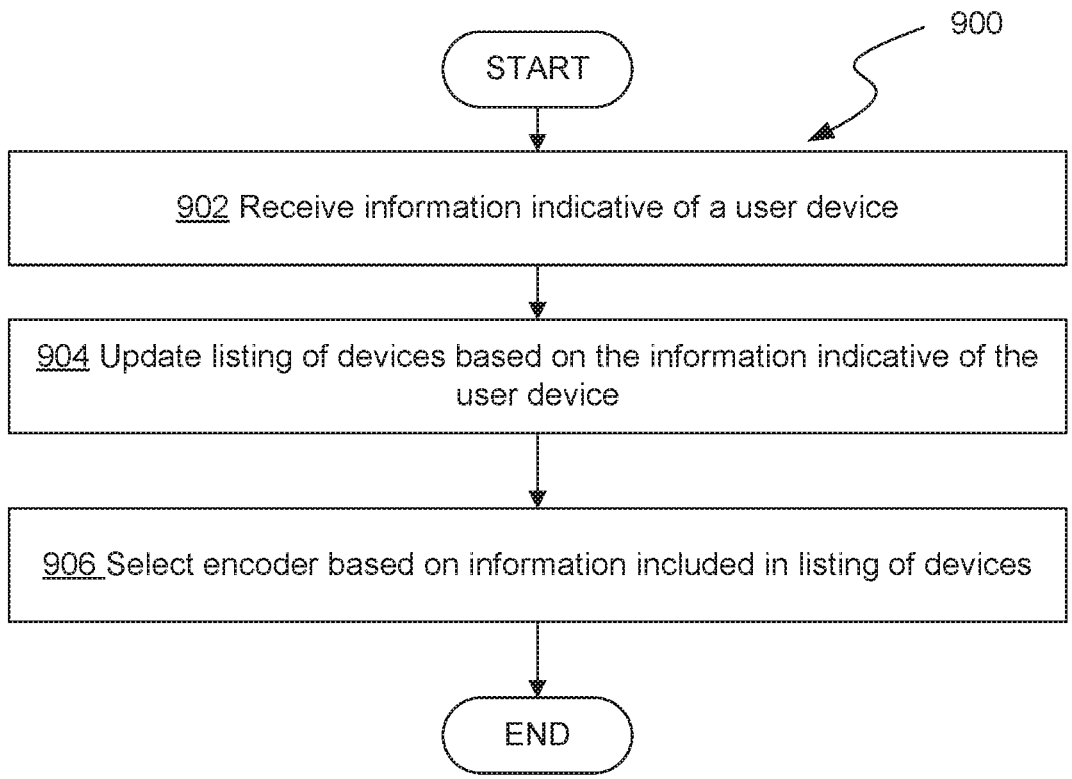
FIG. 9 is a flow diagram of an example process for selecting an encoder based on a user device used to access captured video.

FIG. 9 shows a flow chart of an example process 900 for selecting an encoder based on user playback device. Example process begins at step 902 with receiving information indicative of a user device (e.g., user device 102) that will be utilized to playback video captured and encoded by a camera system. Information indicative of the user device may include, for example, device type, device manufacturer, device model, operating system, connection type, available playback software, available codecs, performance specifications, or any other information relevant to the device. In some embodiments, step 902 may include receiving a user input (e.g., entered via the user device 102) specifying such information. Step 902 may also include automatically detecting (e.g., by base station 105) the user device 102 connecting to the camera system (e.g., to access video) and retrieving information indicative of the user device 102 based on the detected connection. For example, the system may query the connecting user device 102 for device identifying information such as hardware identifiers, software identifiers, instance identifiers, etc. Device identifying information may include, for example, a Universally Unique Identifier (UUID), a device serial number, an operating system version number, etc.

At step 904, a listing of user devices is updated based on the information received at step 904. The listing of devices may comprise one or more tables (or other data structures) stored in memory (e.g., at base station 105 or in cloud storage 148) that include information indicative of the devices that have been used to access video captured by the camera system. In other words, in some embodiments, each time a new user device connects to the system to access video, information indicative of that user device is added to the listing of devices. In some embodiments, the listing of devices may include all devices that have ever connected to the system. Alternatively, in some embodiments, devices may be removed from the listing, for example, if they have not been utilized to access video for a particular period of time (e.g., one month, one year, etc.). The listing of devices may include additional information that can be utilized to prioritize certain devices, such as a time stamp indicating the most recent date/time a given user device was utilized to access video, a count value indicating a number of times a given user device has been utilized to access video, a geographical location from which a given device last connected to the system, subscription level or access permissions associated with the user device, or any other such information.

At step 906, an encoder is selected based at least in part on information included in the listing of devices. The specific criteria applied to select an encoder based on information included in the listing of devices can vary in different embodiments. For example, in some embodiments, a processing system performing step 906 may only select an encoder that is compatible with all of the devices indicated in the listing of devices. In a camera system with many accessing devices, this may not always be possible. Accordingly, in some embodiments, a processing system may select an encoder that is compatible with at least one of the devices indicated in the listing or an encoder that is compatible with some threshold number of devices in the listing (e.g., a majority).

In some embodiments, compatibility with some devices included in the listing may be prioritized over other devices for the purposes of encoder selection. For example, if based on information included in the listing, a processing system determines that a user is using an Apple iPhone™ 10 98% of the time to access video, the processing system may select an encoder that is compatible with the Apple iPhone™ 10 (e.g., HEVC) even if many other devices are included in the listing that are not compatible with such an encoder. In such a situation, the system may instead rely on transcoding (e.g., performed at base station 105 at cloud server 146) to convert encoded video for access by other devices that do not support the selected encoder. Other factors may similarly be considered to prioritize some user devices over others. For example, a processing system may prioritize user devices associated with certain users (e.g., based on subscription level or other permissions) over others.

In any case, selection based on user device may be weighed against other selection criteria when selecting an encoder. Consider again the example of a user that primarily uses an iPhone™ 10 to connect. In such an example, the processing system may select an alternative encoder (e.g., based on VP8 instead of HEVC) if other selection criteria (e.g., royalty costs) outweigh device compatibility.

Encoder Selection Based on Storage and/or Data Transfer Costs

In some embodiments, encoder selection may be based at least in part on costs associated with storage and/or transfer of encoded video.

Figure 10:
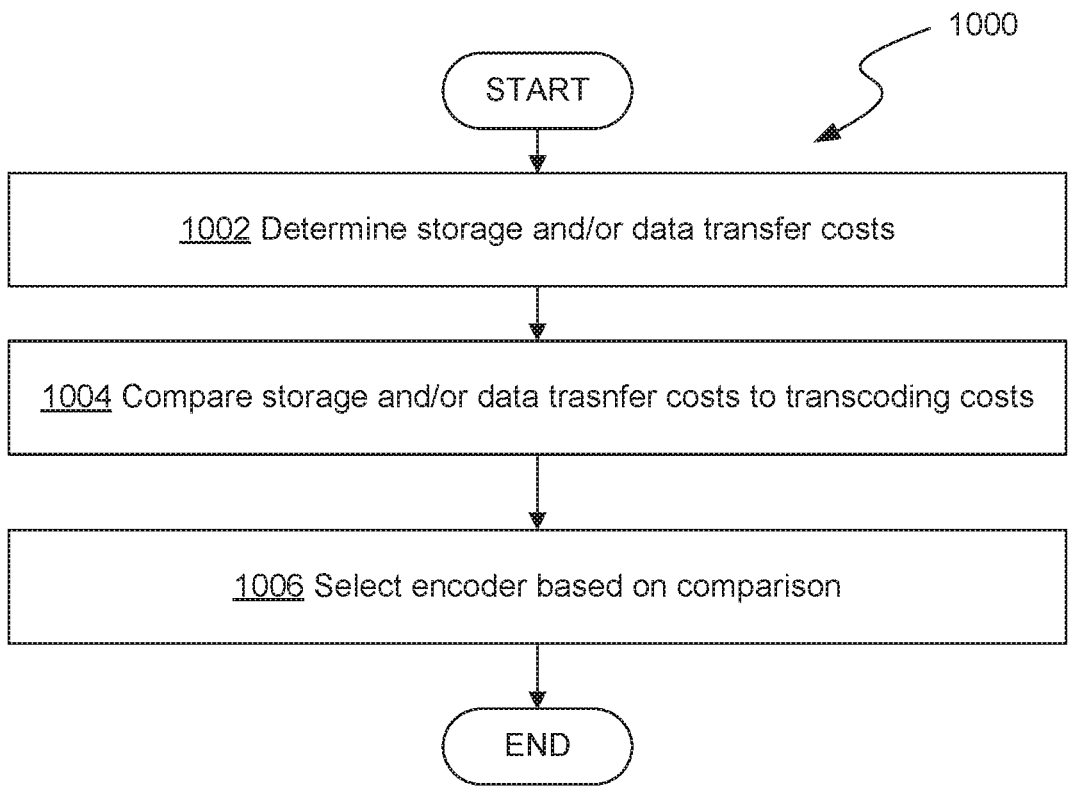
FIG. 10 is a flow diagram of an example process for selecting an encoder based on data storage and/or data transfer costs.

FIG. 10 shows a flow chart of an example process 1000 for selecting an encoder based on storage and/or data transfer costs. Example process begins at step 1002 with determining costs associated with the storage and/or transfer of data associated with encoded video. Costs associated with data storage and transfer may include direct monetary costs, for example, incurred based on fees to a third-party cloud services provider (e.g., Amazon Web Services (AWS)) or a third-party network provider (e.g., an internet services provider (ISP) or cellular data network provider) and/or indirect monetary costs, for example, incurred due to energy expenditure if providing the storage and transfer facilities. For example, if the system is implemented to store video captured by cameras 110/112 in a cloud storage 148 hosted by a third-party cloud services provider, the selection process may consider the fees paid to the cloud services provider when selecting an encoder. Costs may also refer to non-monetary costs such as the opportunity cost associated with devoting limited computing resources to the storage and/or data transfer of one encoded video over another. For example, assuming the system has limited local storage, the selection process may consider the current available space in local storage when selecting an encoder. In both cases, the determined costs may result in selection of higher compression format, if necessary, to reduce overall costs to deliver the video to the user device 102.

As with other selection criteria, the costs associated with storage and data transfer may be weighed against other considerations. In the example process 1000, the costs of data storage and/or transfer are at step 1004 compared against costs associated with transcoding of the video and step 1006 an encoder is selected based on the comparison. For example, if costs associated with storage and/or data transfer outweigh costs associated with transcoding, the selection process may select a higher compression encoder even if the resulting format is not supported by the user device 102 that will playback the video. This can also be weighed against other factors such as royalty costs. For example, H.265 and VP9 based encoders both have a relatively high compression rate. However, VP9 is royalty free while use of H.265 incurs a royalty payment. Accordingly, regardless of compatibility at the user device 102, captured video may be encoded using VP9 for storage and then transcoded (e.g., at base station 105 or cloud server 146) to an appropriate format for the user device 102 if the stored format is not compatible. In an illustrative example, a system may be configured to encode using VP9 EVE and transcode to H.264 for legacy support when needed.

As with other deployment characteristics, costs associated with the storage and/or transfer of data may change over time. For example, a third-party services provider may increase fees associated with services for the storage and/or transfer of data. As a result, encoder selection for any given camera may be updated based on such changes.

Encoder Selection Based on Artifacts

Delivery of encoded video over packet-switched networks can result in some degree of packet loss. This packet loss can result in the introduction of visual artifacts in encoded video streams. The types of visual artifacts and their effect on perception quality by a user may vary based on encoder selection. Accordingly, in some embodiments, in some embodiments, encoder selection may be based at least in part on artifacts introduced, for example, due to packet loss.

Figure 11:
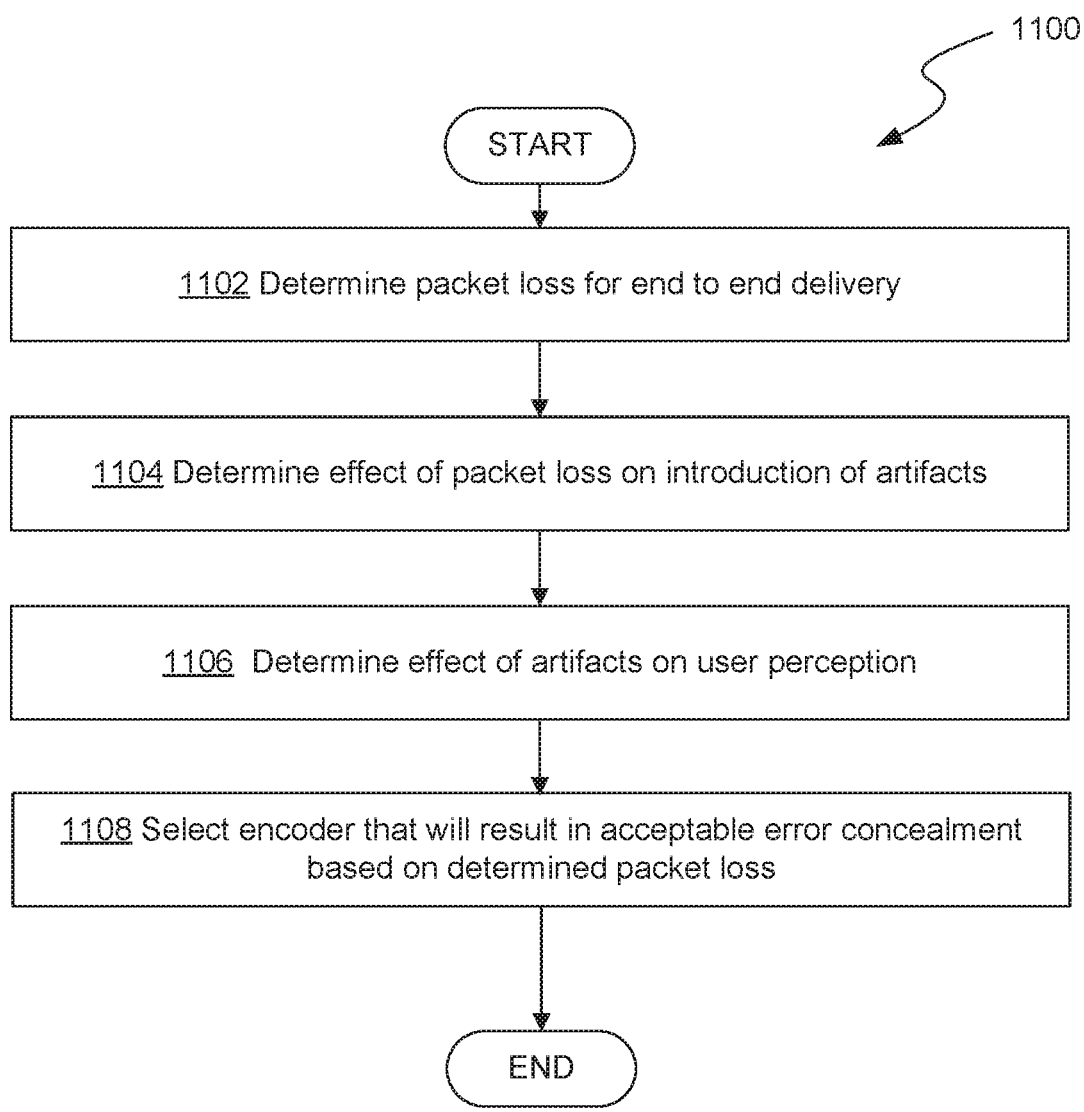
FIG. 11 is a flow diagram of an example process for selecting an encoder based on visual artifacts introduced due to packet loss during transmission.

FIG. 11 shows a flow chart of an example process 1100 for encoder selection based on video artifacts. The example process starts at step 1102 with determining packet loss for end-to-end delivery of an encoded video stream to a user device 102. In some embodiments, determining the packet loss at step 1102 may include monitoring observed packet loss over a particular time period and calculating an aggregation of the observed packet loss (e.g., minimum packet loss, maximum packet loss, average packet loss, etc.) over the particular time period.

The example process 1100 continues at step 1104 with determining the effect of the packet loss (e.g., average packet loss calculated at step 1102) on the introduction of visual artifacts. As previously discussed, different encoders may exhibit varying levels of susceptibility to packet loss. For example, certain codecs may apply various error concealment techniques (e.g., inter-frame and intra-frame interpolation) to reduce the overall effect of packet loss on the introduction of visual artifacts. In other words, given the same level of packet loss, a video encoded using a first encoder may exhibit more visual artifacts than the same video encoded using a different encoder. Further, certain characteristics of the underlying content can also impact the effect of packet loss on the introduction of visual artifacts. For example, error concealment techniques such as frame interpolation may be more effective at concealing the effects of packet loss on video that is mostly static than on video that includes a lot of motion.

The example process 1100 continues at step 1106 with determining the effect of the introduced artifacts on user perception of the video. Not all visual artifacts are equally detrimental to the perceived quality of a transmitted video stream. The overall effect of the packet loss on a viewing user's perception of the video is an important factor to consider when selecting the encoder. In some embodiments, the effect of certain artifacts on user perception can be based on user tests quantified models to establish a correlation between various artifact factors and a user's perception of the video.

An example technique for quantifying the visual impact of an artifact is described in Mu, Mu & Gostner, Roswitha & Mauthe, Andreas & Tyson, Gareth & Garcia, Francisco, "Visibility of individual packet loss on H.264 encoded video stream—A user study on the impact of packet loss on perceived video quality" 10.1117/12.815538, 16th ACM/SPIE Annual Multimedia Computing and Networking Conference, 2009 (hereinafter, "Mu"). Mu describes quantifying the deterioration degree of an artifact in a video stream is by modeling the effect using four artifact factors: Spatial inconsistency (SPIC), Spatial Extent (SPXT), Spatial Priority (SPPR), and Temporal Duration (TPDR). SPIC generally describes discontinuity between artifacts and their neighboring content, SPCT generally describes a number of consecutive macroblocks impaired by an individual packet loss, SPPR generally defines as a priority of the region where the artifacts are located, and TPDR generally defines the number of frames that are affected by a packet loss. User tests can be conducted to measure the impact of various types of artifact factors on perceived quality. Using this model, a quantification of perceived quality (e.g., a mean opinion score or "MOS") can be estimated for a given video stream based on a particular level of packet loss. Other techniques for correlating the effect of packet loss to a user's perception of a stream of video can similarly be implemented.

The example process 1100 continues at step 1108 with selecting an encoder that will result in an acceptable error concealment based on the level of packet loss determined at step 1102. For example, step 1108 may include estimating a score indicative of a perceived quality of video (e.g., MOS) for each of a plurality of encoder options based on an expected packet loss (e.g., determined at step 1102) and selecting an encoder option with a score (e.g., MOS) that satisfies a specified quality criterion (e.g., above a specified threshold).

Example Computing System

Figure 12:
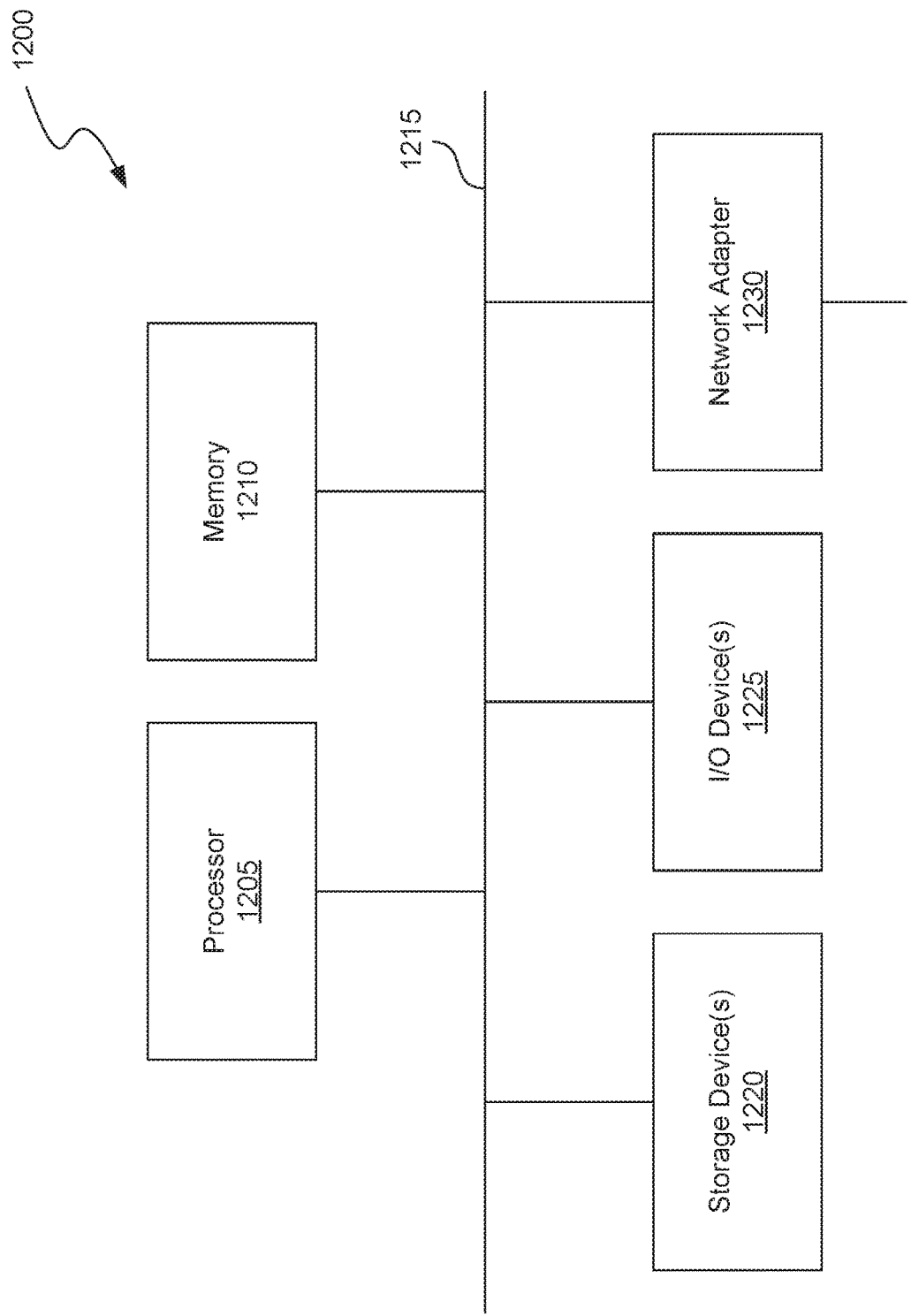
FIG. 12 is block diagram of an example computer system as may be used to implement features of some embodiments of the disclosed technology

FIG. 12 is a block diagram of an example computer system 1200 as may be used to implement certain features of some of the embodiments. The computer system 1200 may be a server computer, a client computer, a personal computer (PC), a user device, a tablet PC, a laptop computer, a personal digital assistant (PDA), a cellular telephone, a telephone, a web appliance, a network router, switch or bridge, a console, a hand-held console, a (hand-held) gaming device, a music player, any portable, mobile, hand-held device, wearable device, or any other machine capable of executing a set of instructions (sequential or otherwise) that specify actions to be taken by that machine.

The computing system 1200 may include one or more processing units (e.g., central processing units (CPU) and/or graphical processing units (GPU) (collectively the "processor") 1205, one or more memory units (collectively "memory") 1210, one or more input/output devices 1225 (e.g. keyboard and pointing devices, touch devices, display devices, audio input/output devices, etc.) one or more storage devices 1220 (e.g. disk drives, solid state drives, etc.), and one or more network adapters 1230 (e.g., network interfaces) that can communicatively couple via an interconnect 1215. The interconnect 1215 is illustrated as an abstraction that represents any one or more separate physical buses, point to point connections, or both connected by appropriate bridges, adapters, or controllers. The interconnect 1215, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, an Institute of Electrical and Electronics Engineers (IEEE) standard 1394 bus (also called Firewire), or any other suitable system for facilitating communication between the various components of the example computing system 1200.

The memory 1210 and storage device 1220 are computer-readable storage media that may store instructions that implement at least portions of the various embodiments. In addition, the data structures and message structures may be stored or transmitted via a data transmission medium (e.g., a signal on a communications link). Various communications links may be used such as the Internet, a local area network, a wide area network, or a point-to-point dial-up connection, etc. Thus, computer readable media can include computer-readable storage media, e.g. non-transitory media, and computer-readable transmission media.

The instructions stored in memory 1210 can be implemented as software and/or firmware to program the processor 1205 to carry out actions described above. In some embodiments, such software or firmware may be initially provided to the processor 1205 by downloading the software or firmware from a remote system through the computing system 1200, e.g. via network adapter 1230.

The various embodiments introduced herein can be implemented by, for example, programmable circuitry, e.g. one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDS, FPGAs, etc.

What is claimed is:

1. A method comprising:
  receiving, by a computing system, data indicative of a characteristic of deployment of a network-connected camera system;
  processing, by the computing system, the received data to select an encoder based on the characteristic of deployment of the network-connected camera system; and
  encoding, by the computing system, video captured by the network-connected camera system using the selected encoder;
  wherein processing the received data to select an encoder includes:
  processing, by the computing system, the received data to determine a location of a camera coupled to the network-connected camera system;
  inferring, by the computing system, a characteristic of a scene captured by the camera based on the determined location of the camera; and
  selecting, by the computing system, an encoder based on the inferred characteristic of the scene captured by the camera.

2. The method of claim 1, further comprising:
  receiving, by the computing system, a second data indicative of a change in the characteristic of deployment of the network-connected camera system;
  processing, by the computing system, the received second data to select a second encoder based on the change in the characteristic of deployment of the network-connected camera system; and
  encoding, by the computing system, video captured by the network-connected camera system using the selected second encoder.

3. The method of claim 2, wherein the second encoder is selected and used to encode video in real time in response to the change in the characteristic of deployment of the network-connected camera system.

4. The method of claim 1, wherein the network-connected camera system includes a plurality of cameras and wherein selecting the encoder includes selecting a specific encoder for each of the plurality of cameras.

5. The method of claim 1, wherein the characteristics associated of deployment of the network-connected camera system are based on any of:
  capabilities of a camera coupled to the network-connected camera system;
  capabilities of a network communicatively coupled to the network-connected camera system;
  capabilities of a storage device communicatively coupled to the network-connected camera system;
  capabilities of a user device through which video captured by the network-connected camera system is accessed by a user;

characteristics of a scene within view of a camera coupled to the network-connected camera system;

costs of storage and/or data transfer of videos captured by the network-connected camera system;

costs of licensing usage of certain encoders in at a location where the network-connected camera system is deployed; or type of user subscription implemented to access video captured by the network-connected camera system.

6. The method of claim 1, wherein selecting the encoder includes selecting an encoder profile by defining one or more encoder parameters included in the encoder profile.

7. The method of claim 6, wherein the one or more encoder parameters include any of an encoding standard, a video codec, a video output format, a video output resolution; a video output bitrate, a speed control parameter, or an encoding technique.

8. The method of claim 1, wherein the received data includes information indicative of storage and/or data transfer costs and transcoding costs wherein processing the received data to select an encoder includes:

comparing, by the computing system, the storage and/or data transfer costs to the transcoding costs; and selecting, by the computing system, an encoder that encodes captured video in a high-compression format if the storage and/or data transfer costs are greater than the transcoding costs.

9. The method of claim 1, wherein the received data includes information indicative conditions of a network through which encoded video is delivered to a user device and wherein processing the received data to select an encoder includes:

processing, by the computing system, the received information indicative of conditions of the network to determine an expected packet loss for end-to-end delivery of encoded video to the user device;

selecting, by the computing system, an encoder that will result in delivery of encoded video to the user device with a perceived quality score above a specified threshold based on the expected packet loss.

10. A method comprising:

receiving, by a computing system, data indicative of a characteristic of deployment of a network-connected camera system;

processing, by the computing system, the received data to select an encoder based on the characteristic of deployment of the network-connected camera system; and encoding, by the computing system, video captured by the network-connected camera system using the selected encoder;

wherein the received data includes video captured the network-connected camera system and wherein processing the received data to select an encoder includes:

processing, by the computing system, the video captured by the network-connected camera system to detect physical objects in the captured video using computer vision;

determining, by the computing system, a characteristic of a scene captured by the network-connected camera system based on the detected physical objects; and selecting, by the computing system, an encoder based on the determined characteristic of the scene captured by the network-connected camera system.

11. The method of claim 10, further comprising:

receiving, by the computing system, a second data indicative of a change in the characteristic of deployment of the network-connected camera system;

processing, by the computing system, the received second data to select a second encoder based on the change in the characteristic of deployment of the network-connected camera system; and encoding, by the computing system, video captured by the network-connected camera system using the selected second encoder.

12. The method of claim 11, wherein the second encoder is selected and used to encode video in real time in response to the change in the characteristic of deployment of the network-connected camera system.

13. The method of claim 10, wherein the network-connected camera system includes a plurality of cameras and wherein selecting the encoder includes selecting a specific encoder for each of the plurality of cameras.

14. The method of claim 10, wherein the characteristics associated of deployment of the network-connected camera system are based on any of:

capabilities of a camera coupled to the network-connected camera system;

capabilities of a network communicatively coupled to the network-connected camera system;

capabilities of a storage device communicatively coupled to the network-connected camera system;

capabilities of a user device through which video captured by the network-connected camera system is accessed by a user;

characteristics of a scene within view of a camera coupled to the network-connected camera system;

costs of storage and/or data transfer of videos captured by the network-connected camera system;

costs of licensing usage of certain encoders in at a location where the network-connected camera system is deployed; or type of user subscription implemented to access video captured by the network-connected camera system.

15. The method of claim 10, wherein selecting the encoder includes selecting an encoder profile by defining one or more encoder parameters included in the encoder profile.

16. The method of claim 15, wherein the one or more encoder parameters include any of an encoding standard, a video codec, a video output format, a video output resolution, a video output bitrate, a speed control parameter, or an encoding technique.

17. The method of claim 10, wherein the received data includes information indicative of storage and/or data transfer costs and transcoding costs wherein processing the received data to select an encoder includes:

comparing, by the computing system, the storage and/or data transfer costs to the transcoding costs; and selecting, by the computing system, an encoder that encodes captured video in a high-compression format if the storage and/or data transfer costs are greater than the transcoding costs.

18. The method of claim 10, wherein the received data includes information indicative conditions of a network through which encoded video is delivered to a user device and wherein processing the received data to select an encoder includes:

processing, by the computing system, the received information indicative of conditions of the network to determine an expected packet loss for end-to-end delivery of encoded video to the user device;

selecting, by the computing system, an encoder that will result in delivery of encoded video to the user device with a perceived quality score above a specified threshold based on the expected packet loss.

19. A method comprising:
receiving, by a computing system, data indicative of a characteristic of deployment of a network-connected camera system;
processing, by the computing system, the received data to select an encoder based on the characteristic of deployment of the network-connected camera system; and
encoding, by the computing system, video captured by the network-connected camera system using the selected encoder;
wherein the received data includes information indicative of a user device used to access video captured by the network-connected camera system and wherein processing the received data to select an encoder includes:
processing, by the computing system, the received information indicative of the user device to update a listing including information indicative of a plurality of user devices that have accessed the network-connected camera system;
selecting, by the computing system, an encoder that is compatible with at east one of the plurality of user devices included in the listing.

20. The method of claim 19, wherein processing the received data to select an encoder further includes:
prioritizing, by the computing system, a first user device of the plurality of user devices over a second user device based on a frequency of usage;
wherein the selected encoder is compatible with the first user device even if the selected encoder is not compatible with the second user device.

21. The method of claim 19, further comprising:
receiving, by the computing system, a second data indicative of a change in the characteristic of deployment of the network-connected camera system;
processing, by the computing system, the received second data to select a second encoder based on the change in the characteristic of deployment of the network-connected camera system; and
encoding, by the computing system, video captured by the network-connected camera system using the selected second encoder.

22. The method of claim 21, wherein the second encoder is selected and used to encode video in real time in response to the change in the characteristic of deployment of the network-connected camera system.

23. The method of claim 19, wherein the network-connected camera system includes a plurality of cameras and wherein selecting the encoder includes selecting a specific encoder for each of the plurality of cameras.

24. The method of claim 19, wherein the characteristics associated of deployment of the network-connected camera system are based on any of:

capabilities of a camera coupled to the network-connected camera system;
capabilities of a network communicatively coupled to the network-connected camera system;
capabilities of a storage device communicatively coupled to the network-connected camera system;
capabilities of a user device through which video captured by the network-connected camera system is accessed by a user;
characteristics of a scene within view of a camera coupled to the network-connected camera system;
costs of storage and/or data transfer of videos captured by the network-connected camera system;
costs of licensing usage of certain encoders in at a location where the network-connected camera system is deployed; or
type of user subscription implemented to access video captured by the network-connected camera system.

25. The method of claim 19, wherein selecting the encoder includes selecting an encoder profile by defining one or more encoder parameters included in the encoder profile.

26. The method of claim 25, wherein the one or more encoder parameters include any of an encoding standard, a video codec, a video output format, a video output resolution, a video output bitrate, a speed control parameter, or an encoding technique.

27. The method of claim 19, wherein the received data includes information indicative of storage and/or data transfer costs and transcoding costs wherein processing the received data to select an encoder includes:
comparing, by the computing system, the storage and/or data transfer costs to the transcoding costs; and
selecting, by the computing system, an encoder that encodes captured video in a high-compression format if the storage and/or data transfer costs are greater than the transcoding costs.

28. The method of claim 19, wherein the received data includes information indicative conditions of a network through which encoded video is delivered to a user device and wherein processing the received data to select an encoder includes:
processing, by the computing system, the received information indicative of conditions of the network to determine an expected packet loss for end-to-end delivery of encoded video to the user device;
selecting, by the computing system, an encoder that will result in delivery of encoded video to the user device with a perceived quality score above a specified threshold based on the expected packet loss.

* * * * *